United States Patent [19]
Cook

[11] Patent Number: 6,120,682
[45] Date of Patent: Sep. 19, 2000

[54] PORTABLE PUMP-TYPE REVERSE OSMOSIS APPARATUS

[76] Inventor: James E. Cook, 418 Rice St., Anoka, Minn. 55303

[21] Appl. No.: 09/165,924

[22] Filed: Oct. 2, 1998

[51] Int. Cl.[7] .................................................. B01D 29/52
[52] U.S. Cl. ..................... 210/97; 210/241; 210/257.1; 210/232; 210/323.2; 210/340; 210/416.3; 210/258
[58] Field of Search ................................ 210/90, 97, 109, 210/110, 241, 257.2, 258, 323.2, 340, 405, 416.1, 416.3, 257.1, 232, 249; 222/189.06

[56] References Cited

U.S. PATENT DOCUMENTS

| | | | |
|---|---|---|---|
| 3,939,074 | 2/1976 | Bray | 210/257.2 |
| 4,110,219 | 8/1978 | Maples | 210/245 |
| 4,978,284 | 12/1990 | Cook et al. | 417/534 |
| 5,645,719 | 7/1997 | Ha et al. | 210/232 |
| 5,720,874 | 2/1998 | Siegler | 210/85 |
| 5,855,795 | 1/1999 | Chang | 210/744 |
| 5,928,503 | 7/1999 | Shang-Chun | 210/86 |
| 5,958,252 | 9/1999 | Shades | 210/748 |

Primary Examiner—W. L. Walker
Assistant Examiner—Terry K. Cecil
Attorney, Agent, or Firm—Roger W. Jensen

[57] ABSTRACT

A portable pump-type reverse osmosis apparatus includes a portable cart having a tub-like housing (12). A pair of elongated cylindrically-shaped R.O. units (36 and 37) sandwiched between a support means (25) and a cover means (45) are positioned within the housing. Both the support and the cover means include a contoured surface having recesses (29, 30, 46, and 47) that snugly engage a substantial portion of the R.O. units. A pump (55) enclosed by a spacer (65) is positioned above the cover means. A water container (75) is positioned above the pump to receive, hold, and dispense purified water from the R.O. units. To protect the unit from an inadequate water supply, a pressure switch (120) is included to permit operation of the R.O. units only when the incoming line pressure is within a preselected range.

5 Claims, 4 Drawing Sheets

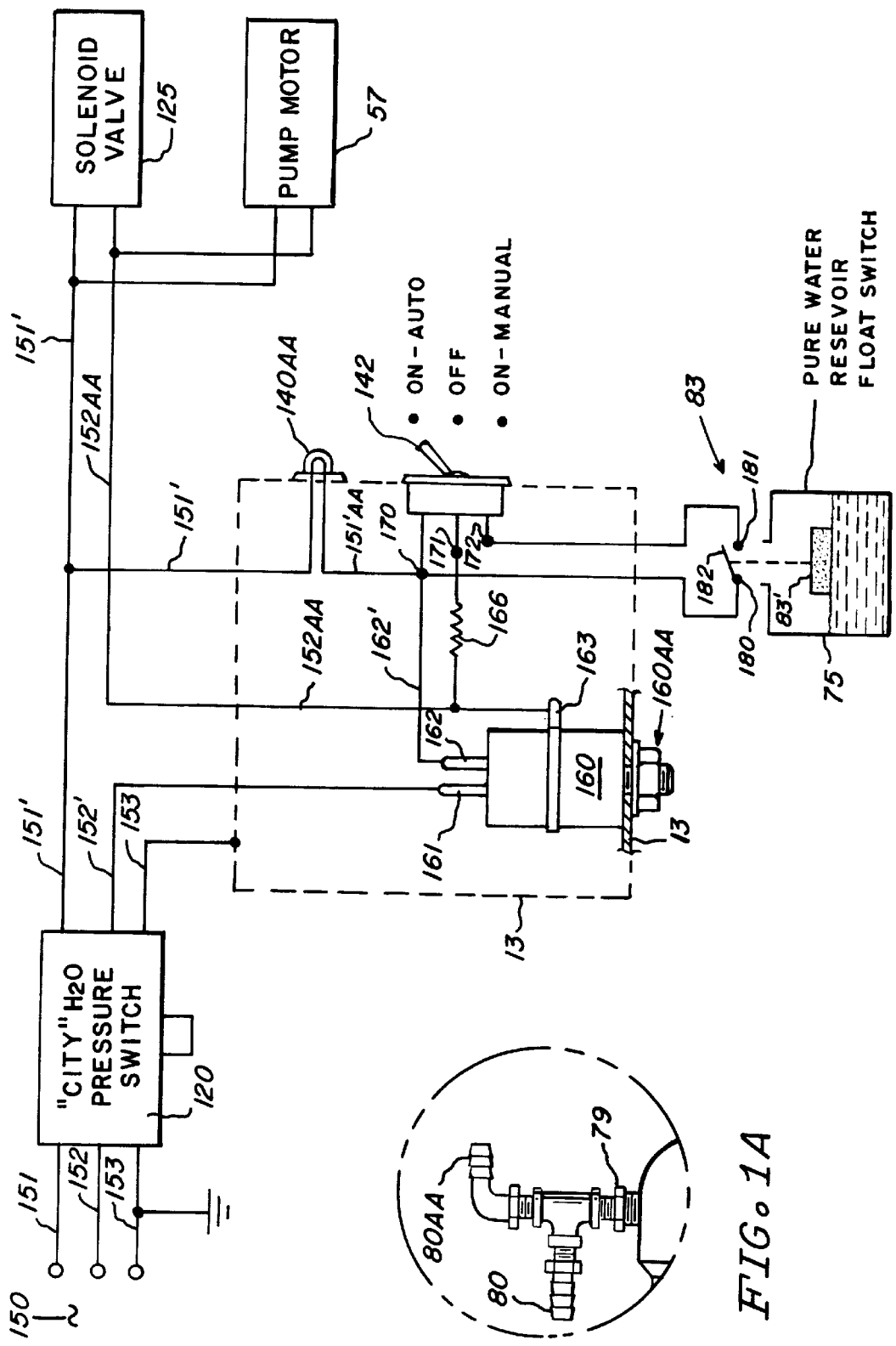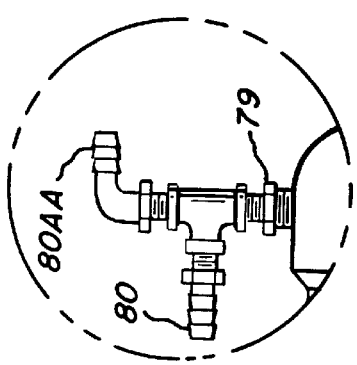

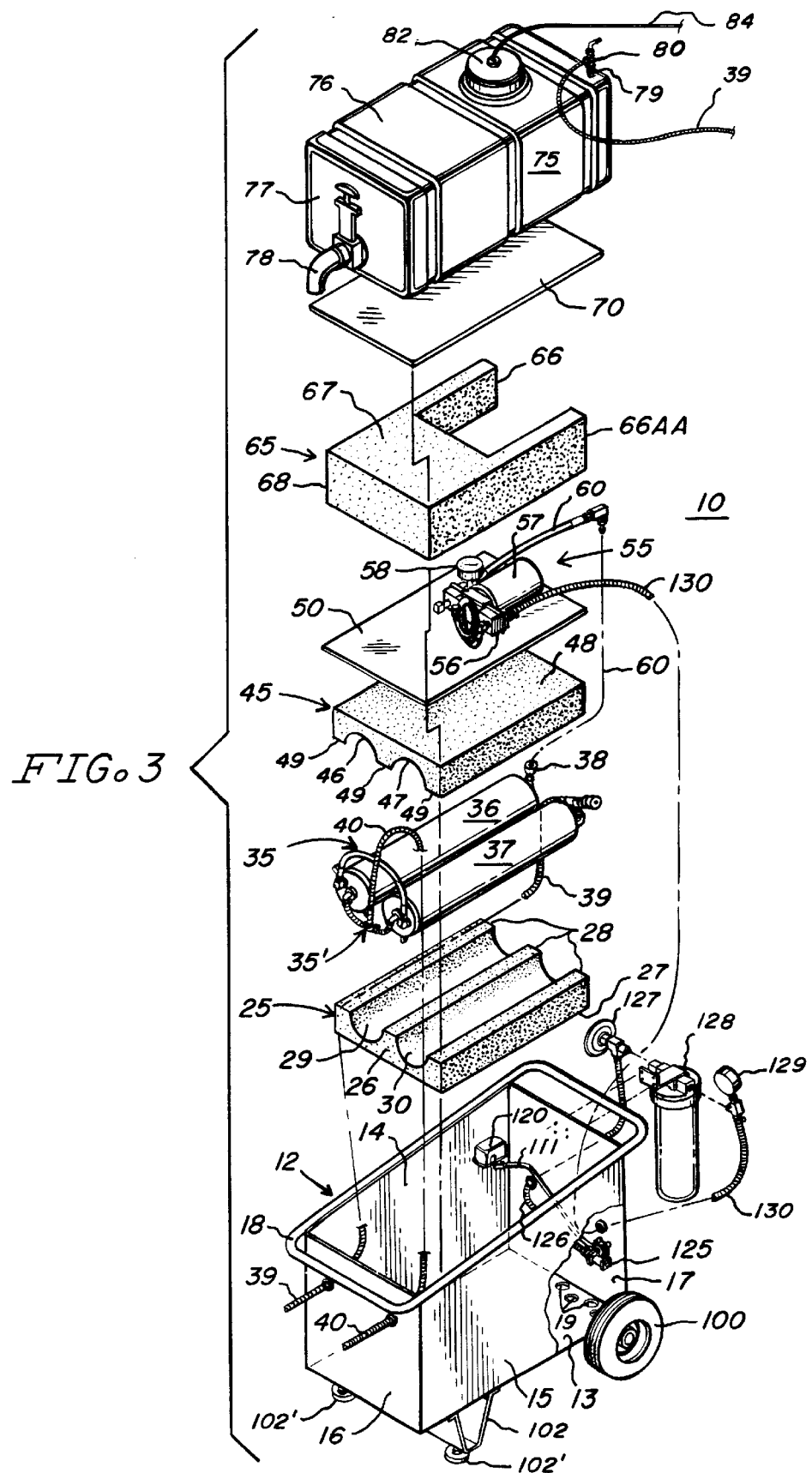

US 6,120,682

PORTABLE PUMP-TYPE REVERSE OSMOSIS APPARATUS

FIELD OF THE INVENTION

This invention relates to the field of reverse osmosis apparatus. Reverse osmosis water purification units, of course, are well known in the prior art for removing dissolved solids from water. Reverse osmosis units utilize a semi-permeable membrane providing passages therethrough which are so small that, although the $H_2O$ molecule will pass through the same, normal dissolved solids attached to it will not. The prior art reverse osmosis apparatus can be divided into two categories: first, those that require a pump system to pressurize the membrane, and second, those that do not utilize a pump. In the latter case, the pressure for operating the total hydraulic system would be derived from the city water main pressure or other static pressure source of untreated water.

SUMMARY OF THE INVENTION

The present invention provides a very compact and portable pump-type reverse osmosis apparatus which can be configured in a portable cart comprising in part a portable tub-like housing having a bottom, side walls and an open top. At least one cylindrically-shaped reverse osmosis unit is positioned in the bottom of the housing but is sandwiched between lightweight lower and upper support and positioning members, the upper member having a supporting surface for an electric-type pump means. Means are provided for connecting the apparatus to the city water main (or other equivalent water source) and to an electrical supply. Importantly, the portable apparatus further comprises water storage container means supported by the housing but above the pump means. When the pump means is energized, then the pump forces untreated water from the city main through the reverse osmosis unit, the output means of which is connected by fluid conduit means to the water container means. Automatic control means may be provided for de-energizing the pump means upon the pure water from the reverse osmosis unit transferred to the container reaching a preselected level within the container. Thus a lightweight, portable R.O. unit is provided yielding a high volume of pure water, e.g., one embodiment is rated at 1600 gallons per day (1.1 GPM) of pure R.O. water.

BRIEF DESCRIPTION OF THE DRAWINGS

FIG. 1A shows a detail of FIG. 1;

FIG. 3 is an isometric exploded right side view of the preferred embodiment of the invention;

FIG. 7 is a representative control circuit for controlling the reverse osmosis apparatus depicted in FIGS. 1–6.

DETAILED DESCRIPTION OF THE INVENTION

Figure 2:
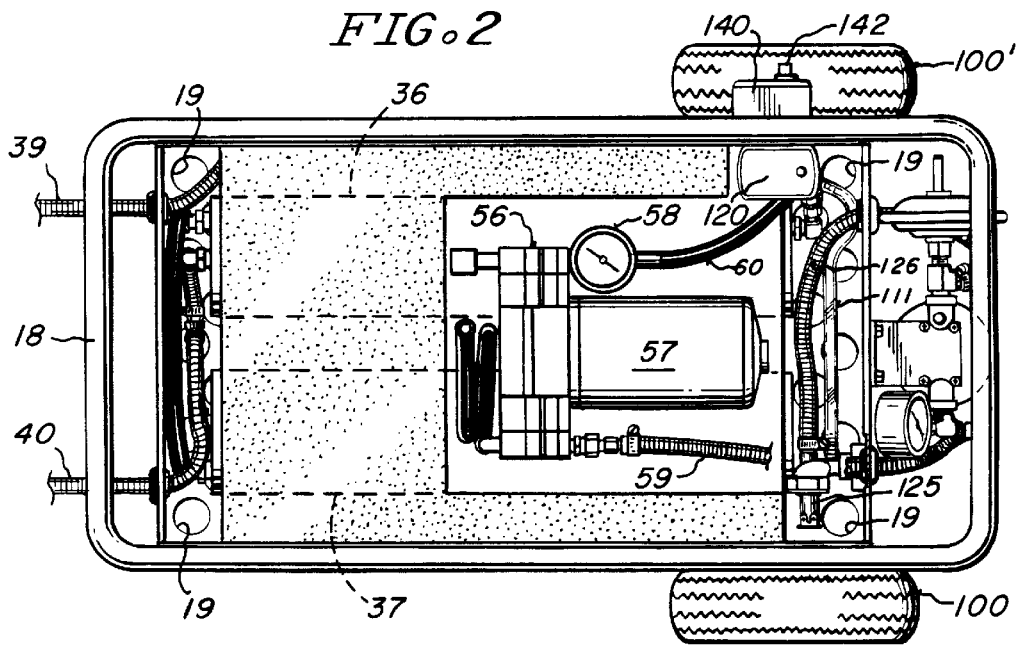
FIG. 2 is a view of the apparatus shown in FIG. 1, as viewed along section lines 2—2 of FIG. 1.

Applicant's unique portable pump-type reverse osmosis apparatus is perhaps most easily discerned from FIG. 3 which shows a portable tub-like housing 12 having a bottom 13, left and right side walls 14 and 15, and back and front end walls 16 and 17. The tops of the walls 14–17 define an open top and a handle means 18 extends around the perimeter of the open top and is attached by suitable means to the sides 14–17. The housing 12 may be made out of any suitable material. Stainless steel is used in the preferred embodiment for both housing 12 and handle 18.

A plurality of suitable apertures 19 are provided in the bottom 13 to permit the safe and timely passage of any water that may leak from the reverse osmosis/pump apparatus.

Figure 4:
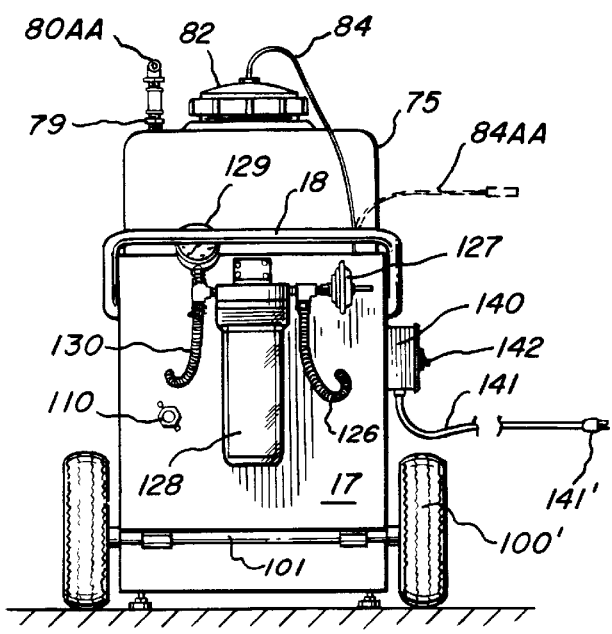
FIG. 4 is a front view of the apparatus shown in FIGS. 1–3.

Adjacent to the front end wall 17 are a pair of suitable wheels 100 and 100' rotatably mounted on an axle means 101 (see FIG. 4). Adjacent the back end wall 16 are a pair of supports 102/102'. The wheels 100/100' and supports 102 are preselected in size so that the bottom 13 of the housing 12 is substantially horizontal; for this scenario, the side and end walls 14–17 and are substantially vertically oriented.

A reverse osmosis support means 25 as shown in FIG. 3 has a flat bottom and preselected width 26 and length 27 so as to be able to support substantially the entire length of two cylindrically-shaped reverse osmosis units 36 and 37 to be discussed below.

Thus, as shown in FIG. 3, the reverse osmosis support means 25 has a pair of parallel semi-cylindrical recesses 29 and 30 preselected in size so as to receive and snugly hold the R.O. units 36 and 37. The top of support means 25 is defined by three parallel coplanar surfaces 28. The R.O. support means 25 may be constructed out of any suitable material for the intended purpose. In the preferred embodiment of the invention, expanded plastic foam which is inherently lightweight, durable, and sufficiently strong, has been found very successful.

In FIG. 3, the reference numeral 35 designates a pair of elongated, cylindrically shaped reverse osmosis units 36 and 37 which, as aforesaid, are adapted to be received and held by the reverse osmosis support means 25. The R.O. units 36 and 37 are standard commercially available units well known to those skilled in the art. In a preferred embodiment, the R.O. units 36 and 37 have stainless steel housings and are connected in series, although the scope of the invention should be understood to include a pair of R.O. units connected in parallel. Another scenario would be to have only a single R.O. unit and finally, it should be understood that the scope of the invention is not limited to one or two R.O. units.

For the arrangement used in the preferred embodiment, the two R.O. units 36 and 37 have certain standard fluid conduit interconnections represented by reference numeral 35' at the left end thereof as shown in FIG. 3. At the right end of the R.O. units is an input connection means 38 adapted to receive city main water from the pump means to be described below. Also at the right end of assembled R.O. units 36 and 37 is an output conduit 39 through which flows pure water processed by the R.O. units.

Reference numeral 45 designates a reverse osmosis cover means adapted to be positioned on top of the R.O. units 36 and 37, the cover means being contoured at on its bottom surface 49 with parallel extending semi-cylindrical recesses 46 and 47 for snugly engaging the top surfaces of the R.O. units 36 and 37; the recesses 46 and 47 thus defining a bottom surface 49 with three parallel extending coplanar surfaces. The support means 25 and cover means 45 have thicknesses which are preselected so that the surfaces 49 will be in substantial contact with surfaces 28, the R.O. units 36 and 37 being sandwiched between. Cover means 45 is preferably made out of the same material as is used for the support means 25.

Figure 1:
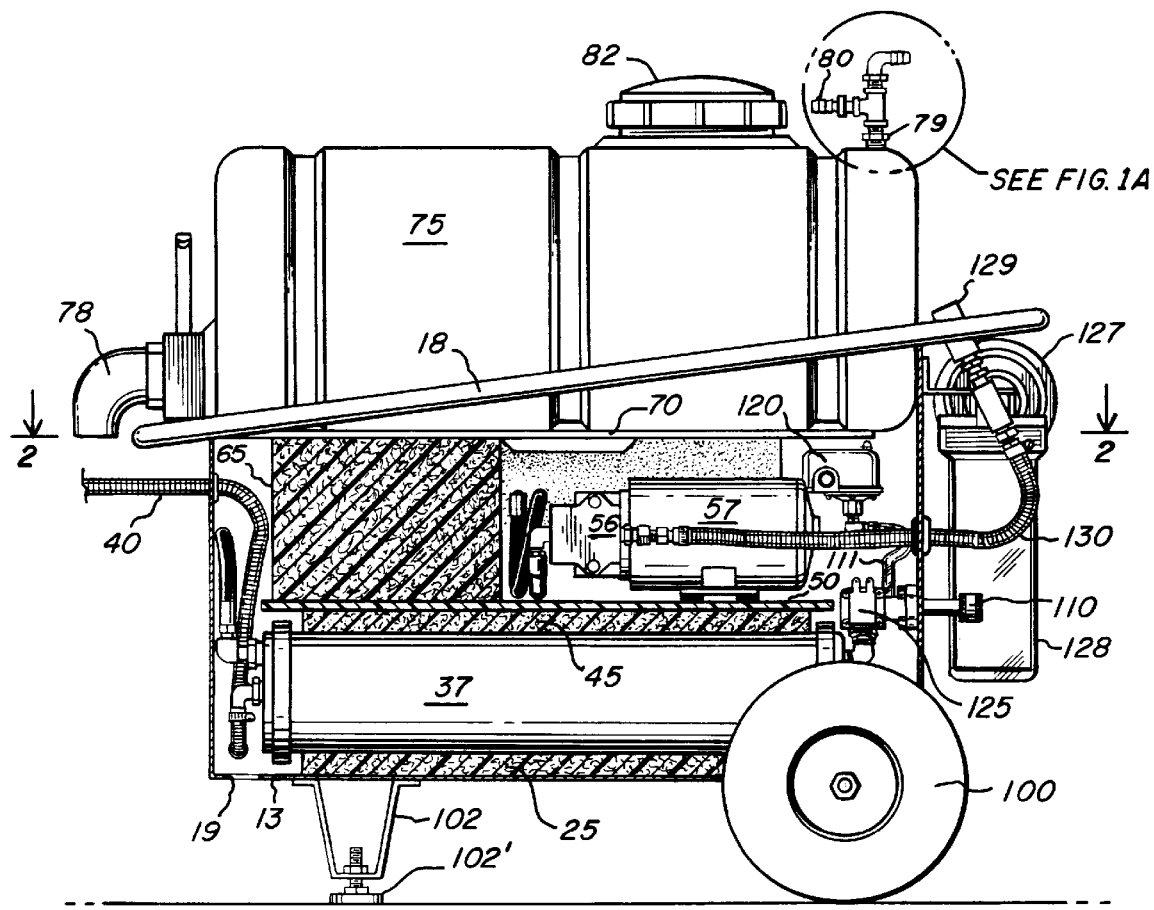
FIG. 1 is a side view, partly in section, of a preferred embodiment of my portable pump-type reverse osmosis apparatus.

A pump support plate 50 has a preselected thickness, width and length; more specifically, the length of the plate 50 is shown in FIG. 1 to be slightly greater than the length of the cover means 45, the width is substantially the same as cover means 45, and the thickness is selected in accordance with the strength of the material used so as to provide an adequate support for the pump means generally designated in FIG. 3 by reference numeral 55.

In the preferred embodiment of the invention the pump means 55 comprises a double-acting simplex plunger pump 56 such as is described in detail in Applicant's U.S. Pat. No. 4,978,284, issued Dec. 18, 1990, the disclosure of same being incorporated herein by reference. An appropriate electrically operable A.C. motor 57 is depicted in FIG. 3 being connected to the pump 56 for operating the same. The apparatus may include a pressure gauge 58 to give a visual indication of the pressure at the outlet 60 of the pump 56 when it is operating. The pump also has an inlet means connected to a supply conduit 130 to be discussed below.

It will be noted that the pump means 55 as shown in FIG. 3 is centrally positioned at the right end of the support plate 50, the attachment between the pump means 55 and the cover being clearly depicted in FIG. 1 where suitable connections are shown between the bottom of the motor 57 and the support plate 50.

A lightweight pump enclosure means 65 has a generally U-shaped configuration, with the bight of the U 67 joining a pair of parallel leg portions 66 and 66AA, the enclosure 65 having a substantial thickness 68 preselected so that the legs 66 and 66AA have a greater elevation than the overall elevation of the pump means 55, it being understood that the enclosure has a lower surface adapted to engage and rest on the top surface of the pump support plate 50. The pump means 55 being straddled by the leg portions 66 and 66AA. Pump enclosure 65 may be made out of any suitable material; the preferred embodiment uses the same material as for members 25 and 45.

A tank support plate 70 is provided to rest on the top surface 67 of the pump enclosure 65 and to provide a support for a tank 75. As shown in FIG. 1, the tank support plate 70 has a length generally the same as the length of the tank 75. It will be understood that the weight of the tank (either full of water or empty) will be supported by the plate 70 which in turn is supported by the pump enclosure 65 resting, as aforesaid, on pump support plate 50 which in turn is supported by the sandwiched assembly of cover means 45, R.O. units 36 and 37, and R.O. support means 25, the bottom surface of which sits on the bottom 13 of the housing 12.

Figure 6:
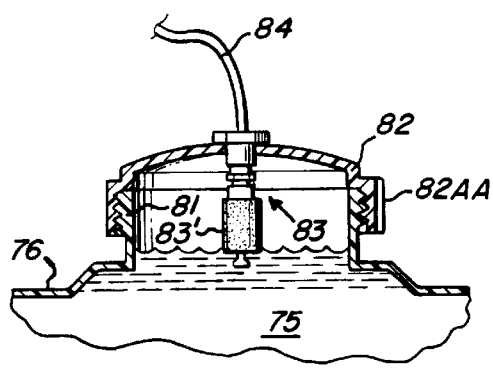
FIG. 6 is a cross-sectional view of a combination cap and water level responsive control means in the fluid container.

In FIG. 3 the top and back end of the tank 75 are designated by reference numerals 76 and 77; a controllable faucet means 78 is provided at the end 77 of the tank 75 for selective emptying of the contents of the tank. In the preferred embodiment the faucet 78 has a high volume capacity, e.g., 1.5 inch, to facilitate very rapid filling of smaller, "transfer" tanks (not shown), e.g., five gallons from the main tank 75, e.g., 20 gallons. The tank 75 has a cover 82 shown in detail in FIG. 6, where it is shown that the cover has a portion 82AA with female threads adapted to coact with male threads on a vertical extension 81 of the tank 75. A pure water reservoir float switch 83 is centrally positioned on the cover 82; the switch includes a float 83' which will be discussed in further detail in connection with a discussion of FIG. 7. The electrical wires associated with the switch 83 are identified by reference numeral 84.

The tank also has a means for filling pure water in the form of a cap 79 having a fitting 80 thereon, as is shown in FIGS. 1, 3 and 4. In FIG. 3, the conduit 39 carrying the pure water output from the R.O. units 35 is shown connected to the fitting 80. The cap 79 is shown in greater detail in FIG. 1A. In addition to the fitting 80, the cap 79 has a pure water overflow 80AA nozzle or port. Thus, if the float switch 83 malfunctions, excess water in tank 75 overflows out of port 80AA to spill onto the floor and thence to the drain receiving waste water from tube 40.

Untreated water, e.g., "city water" from a water main may be connected to the apparatus with a suitable and standard coupling 110 shown in FIGS. 1 and 4 in front end wall 17 of the housing; the fitting 110 is connected to the inlet port of a commercially available solenoid valve means 125 shown in FIGS. 1, 2 and 3, the solenoid outlet being connected to a fluid conduit 126 shown in FIGS. 2, 3 and 4.

The solenoid valve is controlled between an open and closed position by a pressure switch 120 connected hydraulically through a tube 111 to the inlet 110. The pressure switch 120 is also connected to a suitable grounded A.C. source 150, shown in FIG. 7, through means including an electric connection means 141 and 141' shown in FIG. 4. The pressure switch 120 is a commercially available switch well known to those skilled in the art. For example, a Square D Class 9013 Type FSG-2 may be used for this application. One commercially available solenoid valve which may be used with this invention is the ASCO8210 series.

The purpose of the pressure switch 120 is to permit operation of the R.O. unit only when the incoming line pressure at 110 is at or above a preselected threshold and remains within a preselected range, i.e., to protect the unit from an inadequate water supply.

Attached to the front end 17 of the housing are commercially available pressure pulsation dampening device 127, a water filtration assembly or pre-filter 128, and a pressure indicator 129. The output conduit 126 from the solenoid valve 125 is shown to be connected to the pressure pulsation dampening device 127 and thence flow through the filter assembly 128, exiting same through a conduit means 130, the pressure indicator 129 being also connected at the discharge port of the filter assembly 128.

The conduit 130 is shown in FIG. 3 to be connected to the inlet port of the pump 56 which, as aforesaid, pumps the water with increased pressure through its outlet conduit 60 to the inlet fitting 38 of the R.O. assembly 35. As is well understood by those skilled in the art, the water will be purified by the R.O. unit with the pure water output being carried by conduit 39 which, as aforesaid, is connected to the fitting 80 on the cover 79 of the tank 75. The wastewater discharged from the R.O. assembly is carried by conduit 40, shown in FIGS. 1 and 3, to a suitable wastewater disposal means.

Figure 5:
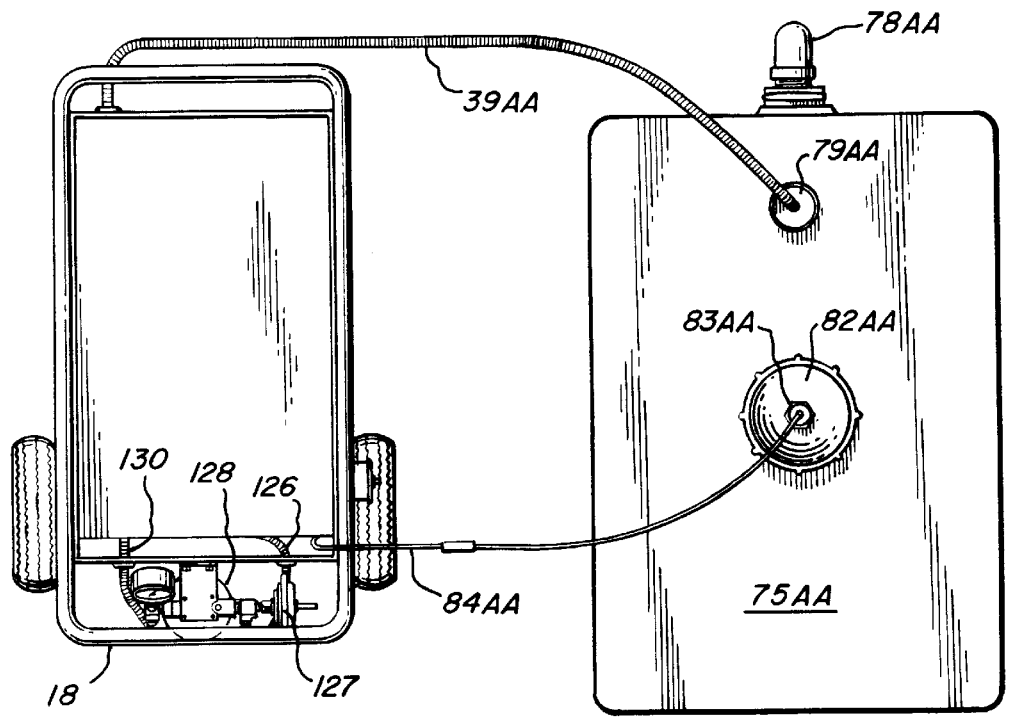
FIG. 5 is a showing of how the portable reverse osmosis unit can be used to fill a water container spaced from, i.e., remote from, the reverse osmosis unit.

FIG. 5 shows one of the uses of the invention wherein the portable R.O. apparatus may be used to fill a remote tank 75AA spaced horizontally from the apparatus 10 receiving pure water through a fluid conduit 39AA connected to a fill cap means 79AA. Further, the arrangement depicted in FIG. 5 includes an electrical connection 84AA connected to a float switch 83AA positioned in the center of a cap 82AA.

FIG. 7 shows a control circuit which may be used with my invention. A grounded source of AC. power 150 has "hot"

lines 151,152 and grounded line 153 connected to one side of the pressure switch 120. If the pressure switch senses sufficient threshold pressure, then connections are made through the switch to output leads 151', and 152' and 153. Line 151' is connected to one side of the solenoid valve 125 and the pump motor 57. The grounded connection 153 is connected to the bottom 13 of housing 12. A suitable switching means 160 is connected at its base to the bottom 13 of the housing 12 (to provide a heat sink), the connection being identified by reference numeral 160AA. The switching means may be any appropriate device well known to those skilled in the art. In the preferred embodiment, an NTE Triac Model 56024 has been used; the unit 160 includes an input terminal 161 connected to pressure switch output 152', a tickler terminal 162 and a power output terminal 163 connected by a lead 152AA to the other sides of solenoid valve 125 and pump motor 57. It will be understood that Triac 160 may be controlled so as to either be on or off, depending in part upon the position of a three-position switch means 142 shown in FIG. 7 to be in the "on-auto" position, the other two positions being "off" and "on-manual". The switch 142 has three terminals, 170, 171, and 172. Terminal 170 is connected via 162' to the tickler terminal 162 of the Triac controller 160. Terminal 170 is also connected via 151'AA to one side of an indicator light 140AA, the other side of which is connected to 151'. Terminal 170 is also connected to one side of one side 180 of a switch 182 connected to the float 83' of the float switch 83. The other side of the switch 181 is connected to terminal 172. Terminal 171 is connected via a resistor 166 to lead 152AA. The operation of the apparatus shown in FIG. 7 is straightforward. Assuming that the pressure switch 120 has been operated so as to have electric power between its outputs 151' and 152', then it should be understood that whenever switch 142 is in the "on-auto" or "on-manual" positions, the controller 160 will function to provide energization to both the solenoid valve 125 and the pump motor 57; subject, however, to the overriding control from float switch 83. This will continue unless switch 142 is moved to the "off" position or until the level of the water in the container 75 get to the point where the float switch 83 opens up the connection between switch plate 182 and the terminal 181. For this latter case, the opening of 182 and 181, as aforesaid, will result in the controller 160 reverting to its "off" condition.

It should be understood that the arrangement depicted in FIG. 7 provides a low voltage for the float switch circuit as compared to the full line voltage supplied to the solenoid valve 125 and pump motor 57.

The scope of the present invention is to be limited by the appended claims rather than by the foregoing description.

I claim:

1. A portable pump-type reverse osmosis apparatus combined integrally with a portable water container for holding water treated by said apparatus comprising:

a. a portable tub-like housing having a flat, horizontally-oriented bottom, left and right vertically-oriented side walls, front and back vertically-oriented walls, and an open top;

b. a pair of elongated cylindrically-shaped reverse osmosis units sandwiched between a reverse osmosis support means and a reverse osmosis cover means, said support means having a bottom side positioned to rest on said housing bottom and a contoured top side having recesses snugly engaging a substantial portion of a bottom surface of said units, said cover means having an upper flat surface and a contoured bottom surface having recesses snugly engaging a substantial portion of a top surface of said units;

c. electrically operable water pump means mounted and positioned on said cover means upper flat surface;

d. spacer enclosure means enclosing said pump means and having an upper surface spaced above said cover means at an elevation that is greater than the overall elevation of said pump means; and e. water container means in fluid communication with said units to receive, hold and dispense purified water therefrom, said container means positioned on top of said spacer enclosure means.

2. Apparatus of claim 1 further characterized by having a support plate means positioned on top of said cover means' upper flat surface and adapted to receive and support said pump means.

3. Apparatus of claim 1 further characterized by having support plate means positioned on top of said upper surface of said spacer enclosure means and adapted to receive and support said water container means.

4. Apparatus of claim 1 further characterized by including pressure switch means connected to receive inlet water pressure and adapted to control valve means to permit inlet water to be connected to said pump.

5. Apparatus of claim 4 including means for applying electric power to said pump means.

* * * * *